(12) United States Patent
Hodrus et al.

(10) Patent No.: US 8,392,083 B2
(45) Date of Patent: Mar. 5, 2013

(54) CLUTCH CONTACT POINTS

(75) Inventors: Erhard Hodrus, Karlsruhe (DE); Juergen Eich, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/348,375

(22) Filed: Jan. 11, 2012

(65) Prior Publication Data

US 2012/0109473 A1    May 3, 2012

Related U.S. Application Data

(63) Continuation of application No. PCT/DE2010/000730, filed on Jun. 24, 2010.

(30) Foreign Application Priority Data

Jul. 16, 2009 (DE) .................. 10 2009 033 840

(51) Int. Cl.
*F16D 43/00* (2006.01)

(52) U.S. Cl. ........... 701/67; 701/51; 701/58; 701/60; 701/64; 477/70; 477/166; 477/180

(58) Field of Classification Search .......... 701/51, 701/58, 59, 60, 64, 67, 68; 477/70, 166, 477/174, 180

See application file for complete search history.

(56) References Cited

U.S. PATENT DOCUMENTS

| | | | | |
|---|---|---|---|---|
| 5,337,874 A * | 8/1994 | Oltean et al. | ............. | 192/70.252 |
| 5,393,274 A * | 2/1995 | Smedley | ............. | 477/74 |
| 5,411,124 A * | 5/1995 | Olson | ............. | 192/103 R |
| 5,624,350 A * | 4/1997 | Bates | ............. | 477/78 |
| 5,993,352 A * | 11/1999 | Kosik et al. | ............. | 477/74 |
| 6,022,295 A * | 2/2000 | Liu | ............. | 477/180 |
| 6,086,514 A * | 7/2000 | Jones et al. | ............. | 477/180 |
| 6,490,944 B1 * | 12/2002 | Heinzel et al. | ............. | 74/335 |
| 6,883,394 B2 * | 4/2005 | Koenig et al. | ............. | 74/335 |
| 6,922,623 B2 * | 7/2005 | Rieger et al. | ............. | 701/67 |
| 7,044,280 B2 * | 5/2006 | Budal et al. | ............. | 192/48.9 |
| 7,392,721 B2 * | 7/2008 | Pollak et al. | ............. | 74/330 |
| 7,424,356 B2 * | 9/2008 | Jung et al. | ............. | 701/67 |
| 2007/0209901 A1 * | 9/2007 | Ehrlich et al. | ............. | 192/84.6 |
| 2009/0131217 A1 * | 5/2009 | Jager et al. | ............. | 477/80 |
| 2010/0268428 A1 * | 10/2010 | Ellis | ............. | 701/67 |

FOREIGN PATENT DOCUMENTS

| | | |
|---|---|---|
| DE | 10213946 | 10/2002 |
| DE | 10352611 | 6/2005 |
| DE | 102007025501 | 12/2008 |
| DE | 102008023360 | 12/2008 |
| DE | 102009004709 | 7/2009 |
| EP | 1067008 | 1/2001 |

* cited by examiner

*Primary Examiner* — Thomas Black
*Assistant Examiner* — Peter D Nolan
(74) *Attorney, Agent, or Firm* — Simpson & Simpson, PLLC

(57) ABSTRACT

A method for controlling a twin clutch transmission including at least two partial drive trains, each of which is coupleable to a combustion engine using a clutch.

9 Claims, 5 Drawing Sheets

(State of the Art)

CLUTCH CONTACT POINTS

CROSS-REFERENCE TO RELATED APPLICATIONS

This application is filed under 35 U.S.C. §120 and §365(c) as a continuation of International Patent Application No. PCT/DE2010/000730 filed Jun. 24, 2010, which application claims priority from German Patent Application No. DE 10 2009 033 840.3 filed Jul. 16, 2009, which applications are incorporated herein by reference in their entireties.

FIELD OF THE INVENTION

The invention relates to a method for controlling a twin clutch transmission including at least two partial drive trains, each of which is coupleable to a combustion engine using a clutch.

BACKGROUND OF THE INVENTION

In modern motor vehicles, automated clutches, i.e., clutches operated by an actuator, are becoming increasingly common. In most cases, the position of an actuating element of the clutch and/or of the actuator, is determined using an incremental counter that immediately provides information only on the actuating paths that have just been traveled through, but not on the absolute position of the actuating element. To detect the absolute position, a referencing process is required wherein the actuator moves the clutch into a predetermined actuating position and the respective counter reading of the incremental counter is read out.

A fundamental problem of such incremental path measurements is their dependence on the exact determination of the reference position. This problem is intensified by the fact that during the operation of a vehicle, malfunctions are to be expected that may cause the absolute position of the clutch actuator and/or of the actuating element of the clutch and thus the clutch torque set by the actuator to become unknown to the electronic control device. As a result, safety-critical events may occur—for instance, the vehicle may start to move without the driver's intention. An exact knowledge of the respective operating position of the clutch is particularly safety-relevant in a twin clutch transmission in which two clutches need to be operated in a precisely coordinated manner relative to each other.

Such twin clutch transmissions are used in motor vehicles as power shift transmissions. Power shift operation is possible since every partial drive train can be operated separately and independently of the second partial drive train. Thus in one partial drive train the clutch may be closed and a gear may be engaged to operate the vehicle. During this operation, a gear having a different transmission ratio may be engaged in the second partial drive train. To shift gears, the clutch of the partial drive train that is currently in operation is opened while the clutch of the partial drive train that is to be activated is being closed. During such a process, which may be referred to as a period of overlap or an overlapping shift, both clutches transmit a torque to their partial drive trains. To prevent the power take-off from locking as a result of the different transmission ratios of the two gears engaged in the two partial drive trains, the sum of the transmittable torques on both clutches must not exceed the torque to be transmitted (e.g., the engine torque) by any large amount.

The contact points of the clutch are determined at the initial start of operation and are then adapted as required during the operation of the vehicle.

The adaption of the clutch parameters, in particular of the contact points, by evaluating the torques of a drive train monitoring element during operation is described in German Patent Document No. 10213946 A1.

German Patent Document No. 10 2008 023 360 A1 discloses to determine the contact point by bringing the input shaft of the clutch in question to a predetermined rotational speed by closing the clutch. When the clutch is opened, the rotational speed will decrease. Upon re-closing the clutch, the speed gradient can be evaluated. At the instant at which the gradient changes significantly, the clutch starts to transmit a torque, and the current clutch position is interpreted as the contact point.

European Patent Document No. 1 067 008 B1 discloses to directly draw conclusions on the torque that acts on the rotational body "input shaft" by disengaging the gear and evaluating the speed gradient of the input shaft. At the instant of disengagement of the gear, the clutch has already been closed to a certain torque value. The torque resulting from the speed gradient and the known mass inertia of the input shaft will always be falsified by a drag torque (for instance caused by bearing friction). To determine the drag torque, the process is repeated and the gear is disengaged with the clutch open. Compared to the method disclosed in DE 10 2008 023 360 A1, the process disclosed herein always starts at the synchronization speed of the input shafts. This is necessary because the method is tailored to wet clutches in which the drag torques are highly dependent on the slip speed.

A disadvantage of detecting the clutch contact point in accordance with the method disclosed in EP 1 067 008 B1 is that the gears are frequently engaged and disengaged—in some cases even against the action of a clutch torque. The synchronization devices involved in the process are thus of a more robust design to be able to withstand the increased wear. Another disadvantage is that the shift program cannot change to the shaft that has so far been inactive when the gear is disengaged to determine the contact point. Thus the method cannot be repeated ad libitum without affecting the shifting process.

German Patent Document No. DE 10 2007 025 501 A1 discloses to close the clutch when the gear is disengaged. At the instant at which the transmission input shaft speed changes very quickly towards the engine speed, the current clutch position is interpreted as the contact point. In contrast to the method disclosed in DE 10 2008 023 360 A1, this document does not make any suggestion as to how to deal with an input shaft that co-rotates due to drag torques or the overcoming of static friction.

Experiments have shown that the speed of the input shaft will not always decrease on the shaft in question when the clutch is open and the neutral gear engaged. In many cases, the input shaft will continue to co-rotate with the engine due to drag torques of the clutch bearing. Friction occurs in the bearings between the two input shafts of the two partial transmissions, which are embodied as hollow shaft and massive shaft.

BRIEF SUMMARY OF THE INVENTION

An object of the present invention is to determine the contact points independently of the engine torque, as often as possible, if possible without affecting the shifting process, and without increased wear during operation of the vehicle.

In accordance with the invention, a method envisages controlling a twin clutch transmission that includes at least two partial drive trains, each of which is coupleable to a combustion engine using a clutch. The method includes the following steps to be carried out on the inactive partial drive train:

changing from an engaged gear to neutral with the clutch open;

determining the drag torque $M_S$ of the input shaft of the inactive partial drive train during a predetermined period P1;

closing the clutch of the inactive partial drive train to a predetermined position in which a clutch torque is transmitted and determining a total torque M of the input shaft of the inactive partial drive train during a predetermined period P2;

determining the clutch torque $M_K$ of the input shaft of the inactive partial drive train from the drag torque $M_S$ and the total torque M as the sum of the drag torque $M_S$ and the clutch torque $M_K$; and, determining the contact point position from the absolute value of the determined clutch torque $M_K$ and from the clutch characteristic of the clutch of the inactive partial drive train.

An advantage of the invention is that it can be used to quickly determine the clutch contact points in twin clutch transmissions during vehicle operation.

In accordance with a particularly advantageous embodiment, the predetermined position is a position of the clutch in which the clutch transmits a low torque.

In accordance with a further advantageous embodiment, the predetermined position is a position of the clutch that is between the open position of the clutch and the contact point position determined prior to period P1.

Alternatively, the predetermined position may be a position of the clutch that is between the open position of the clutch and the contact point position determined prior to period P1 plus an offset.

The offset is preferably between 0 and 5 mm.

In accordance with a further preferred embodiment, the drag torque $M_S$ is determined in accordance with the equation $$M_S = \Theta_{EW1} \frac{\pi}{30} \dot{n}_1$$

with $\Theta_{EW1}$ the moment of mass inertia of the inactive input shaft of the inactive partial drive train and $n_1$ the rotational speed of the inactive input shaft of the inactive partial drive train.

In accordance with a further preferred embodiment, the total torque M is determined according to the equation $$M = \Theta_{EW1} \frac{\pi}{30} \dot{n}_1$$

with $\Theta_{EW1}$ the moment of inertia of the input shaft of the inactive partial drive train and $n_1$ the rotational speed of the inactive input shaft of the inactive partial drive train.

In accordance with a particularly preferred embodiment, the periods P1 and P2 are selected in a way that their sum is shorter than the period during which the neutral gear is engaged.

In accordance with a further preferred embodiment the clutch of the inactive partial drive train is subsequently opened and a gear is engaged in the inactive partial drive train. This gear may be different than or alternatively the same as the one from which the shift to neutral occurred with the clutch open.

In accordance with the invention, a computer program product with a computer program is proposed that comprises software means for implementing a method as described above when the computer program is executed on a computer. Such a computer may be part of a control device for controlling a twin clutch.

In accordance with the invention, a device is proposed for controlling a twin clutch transmission including at least two partial drive trains, each of which is coupleable to a combustion engine via a clutch. With the aid of such a device, the methods described above can be carried out on the inactive partial drive train.

BRIEF DESCRIPTION OF THE DRAWINGS

Further advantages and advantageous embodiments of the invention will become apparent from the Figures listed below and their descriptions.

DETAILED DESCRIPTION OF THE INVENTION

Figure 1:
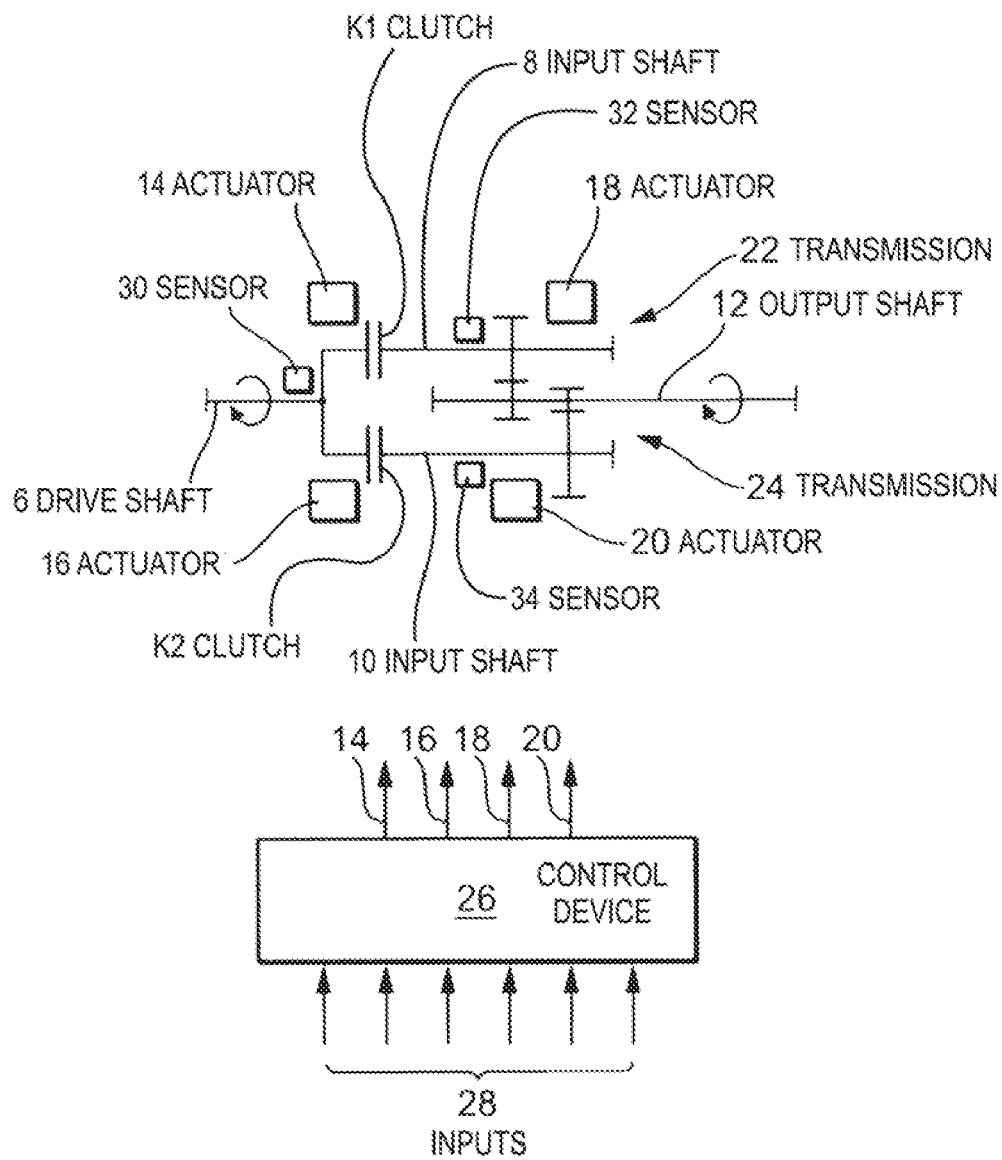
FIG. 1 illustrates a block diagram of a twin clutch transmission of essentially known construction and of the associated electronic control device.

As shown in FIG. 1, a prior art twin clutch transmission or parallel shift transmission includes a drive shaft 6 that is driven, for example, by a combustion engine and is selectively connectible for co-rotation to two input shafts 8 and 10. The flow of torque from the drive shaft 6 to the input shafts 8 and 10 is selectively controllable via a respective clutch K1 and K2. Different transmission ratios can be set between the input shaft 8 and an output shaft 12 using gear pairings of which only one is shown. Likewise, different gear pairings are shiftable between input shaft 10 and the output shaft 12. Actuators 14 and 16 are provided to operate the clutches K1 and K2. Actuators 18 and 20, each of which may include a shift actuator and a selector actuator, for instance, are provided to shift the gear pairings, for example to establish a connection for co-rotation between the gear arranged on input shaft 8 or 10 and meshing with a gear permanently connected to co-rotate with the output shaft 12, and the respective input shaft 8 or 10. Together, input shaft 8 and output shaft 12 as well as input shaft 10 and output shaft 12 form a respective partial transmission 22, 24 of the twin clutch transmission.

An electronic control device 26 including a microprocessor and associated program and data memories is used to actuate the actuators 14, 16, 18, and 20. Each output of the control device 26 controls a respective one of the actuators, and the inputs 28 thereof are connected to sensors 30, 32 and 34, respectively, which detect the rotational speed of drive shaft 6, input shaft 8, and input shaft 10, and to further sensors for detecting operating parameters of the drive train of the vehicle, for example a sensor for detecting the rotational speed of the driven wheels of the vehicle, a sensor for detecting the position of a shift lever, a sensor for detecting the position of a gas pedal etc. A bus system may connect the illustrated control device 26 to further control devices of the vehicle such as an engine control device for controlling the power control element of the engine. The actuators may be lever actuators that are controlled by an electric motor, for example, with the revolution of each electric motor being recorded by a (non-illustrated) incremental counter.

The respective torque transmittable by a clutch is an important aspect in terms of the functioning of a clutch. It is stored in a memory of the control device 26 as a curve plotting the transmittable clutch torque as a function of the position of a clutch actuator such as a clutch lever. When the functional state of the clutch changes due to wear or the like, the characteristic needs to be updated. This is done in an adaptation process for the purpose of which it is necessary, for example, to check the contact point of the clutch during operation and to adapt it to potentially resultant changes of the clutch properties.

In the twin clutch transmission shown in FIG. 1, a respective gear may be engaged in the respective partial transmission 22 or 24 whose clutch is open while the effective transmission ratio is defined by the (active) partial transmission whose clutch is closed. For instance, if a gear is engaged in partial transmission 22 and clutch K1 is closed, this gear determines the transmission ratio between the drive shaft 6 and the output shaft 12. At the same time, a new gear may be engaged in the other partial transmission 24. When the transmission is shifted from the current gear to the new gear, clutch K1 needs to be opened and clutch K2 needs to be closed. To ensure that the tractive force connection between the drive shaft 6 and the output shaft 12 is not disrupted, there needs to be an overlap between the opening of clutch K1 and the closing of clutch K2. When clutch K2 takes over torque transmission, the transmission would be destroyed due to the transmission ratio redundancy if not at least one of the clutches K1, K2 slipped at the same time. Thus when both clutches K1, K2 are simultaneously closed beyond their contact point, which is defined as the point at which the clutch transmits a torque as it continues to close (at the contact point, a torque of only a few Newton-meters at the maximum is transmitted), at least temporarily a slip state is established in which at least one of the two clutches K1, K2 slips.

Based on FIG. 2, a conventional shifting process in a twin clutch transmission will be explained below. The abscissa represents the time, for instance in seconds. In diagram a), curve I indicates the shifting condition of one of the partial transmissions, for example partial transmission 22, and curve II illustrates the shifting condition of the other partial transmission, for example partial transmission 24.

In diagram b), in which the ordinate indicates a transmittable torque, curve TK1 indicates the torque transmittable by clutch K1 and curve TK2 indicates the torque transmittable by clutch K2.

In diagram c), in which the ordinate indicates the speed/rpm, curve N6 indicates the speed/rpm of drive shaft 6, which is for instance identical with the speed/rpm of the crankshaft of a combustion engine; curve N8 indicates the speed/rpm of input shaft 8 and curves N10 indicate the speed/rpm of input shaft 10.

Figure 2A:
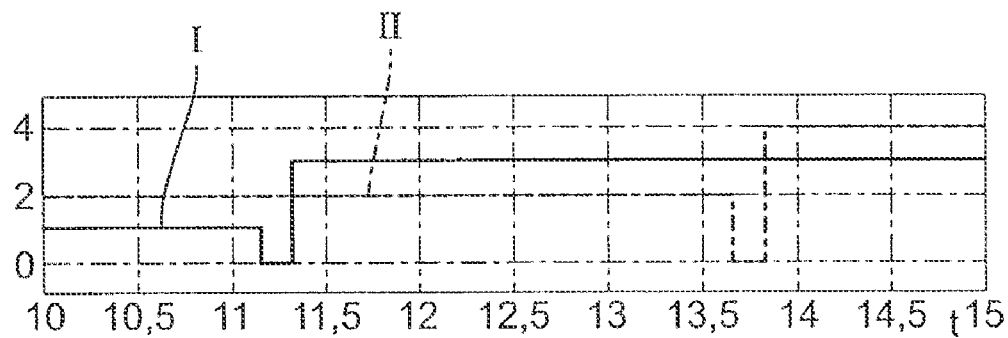
FIGS. 2A-2C illustrates time diagrams to explain a conventional shifting operation.
Figure 2B:
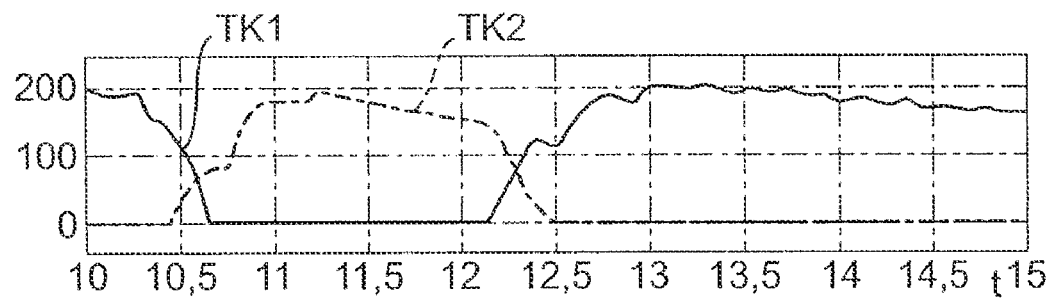
Figure 2C:
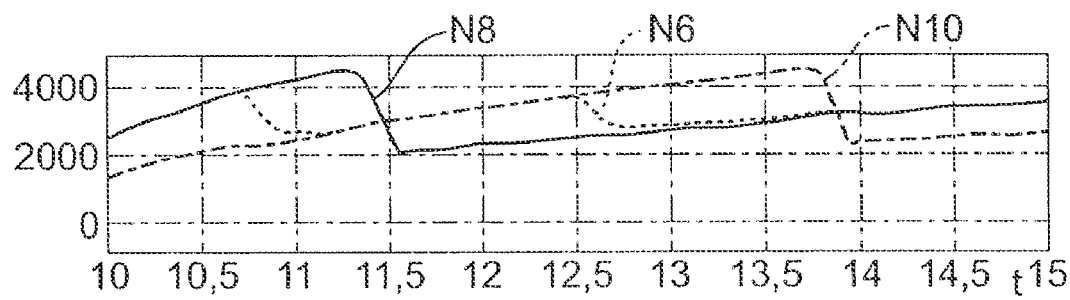

The diagrams shown in FIG. 2 will be used to explain a shifting operation from the second gear to the third gear with subsequent preselection shift from the second to the fourth gear. The explanation focuses on the time between t=12 seconds and t=14.5 seconds.

At the instant t=12 seconds, the third gear is engaged in the first partial transmission 22 and the second gear is engaged in the second partial transmission 24. At this instant, the engine torque is transmitted via the second partial transmission 24. This is apparent from the fact that the clutch torque is more than 0 in accordance with curve TK2.

At the instant t=12, a shifting operation is initiated. Between t=12 seconds and t=12.5 seconds, the clutch torque of clutch K2 decreases to 0. At the same time, the clutch torque of clutch K1 increases in an overlapping manner. From t=12.5 seconds on, the engine torque is transmitted via clutch K1 and partial transmission 22 and the vehicle is in third gear. Between the instant t=12.5 seconds and the instant t=13 seconds, the engine speed N6 and the speed N8 of the input shaft 8 of the first partial transmission 22 are being synchronized.

Between t=13.5 seconds and t=14 seconds a preselection shift to the fourth gear is made in the second partial transmission 24 in order to be able to shift into this gear at a later point without interrupting the tractive force.

It is to be understood that in particular in terms of the actual instants given above, this shifting process of a twin clutch transmission as explained with reference to FIG. 2 is only one possible example.

The determination of the contact point is an essential feature in the functioning of a clutch.

It is desirable to be able to determine the contact points during regular vehicle operation without any negative effect on the latter. For this purpose, the process that will be explained in more detail below and starts with a passive monitoring of the speed, is initiated on the inactive input shaft for every gear shift. After a defined period of time, the inactive clutch must be actively closed to a predetermined clutch position. However, this second step is only carried out if there is a high probability that the process can be completed successfully. This is a way to avoid unnecessary actuator movements and thus wear. The vehicle is driven via the active partial transmission and the active input shaft. The terms "partial drive train" an "partial transmission" are used synonymously in the present document.

The method of the invention in particular describes the determination of the contact point during vehicle operation. However, it may likewise be used to determine the contact point at the initial start of operation of the vehicle or to carry out a plausibility check on the clutch condition (clutch definitely open).

The following paragraph is about the inactive input shaft 1 and the active input shaft 2. In this context, numbers 1 and 2 are not to be understood as reference numerals. The speed development of input shaft 1 is indicated by reference numeral 70; the speed development of input shaft 2 is indicated by reference numeral 80. In the same vein, numbers 1, 2 and 3 in the context of gear 1, gear 2, and gear 3 are not to be understood as reference numerals. Gear 1 has reference numeral 90, gear 2 reference numeral 120 and gear 3 reference numeral 110.

Figure 3:
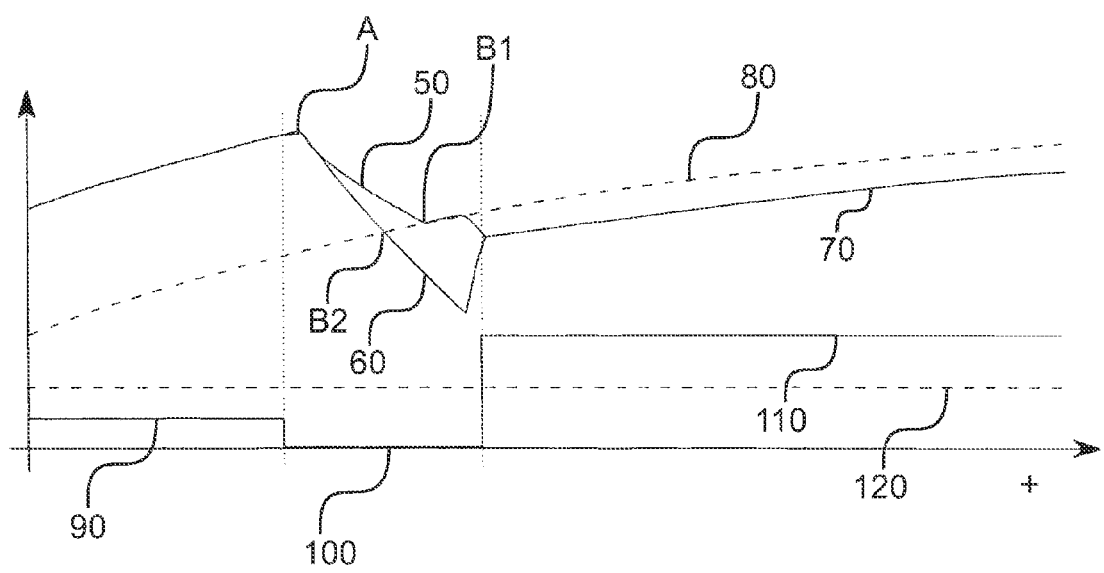
FIG. 3 illustrates a gear shift from gear 1 to gear 3 on the inactive input shaft.

FIG. 3 illustrates a gear shift on the inactive input shaft 1 (speed of input shaft 1: reference numeral 70) from gear 1 90 to gear 3 110. When the neutral gear 100 is selected on input shaft 1, input shaft 1 and the clutch disc of clutch K1 fixed thereto will initially continue to rotate and will finally be decelerated due to friction in the bearings.

In case I 50, the drag torque in the bearing relative to input shaft 2 (speed of input shaft 2: reference numeral 80) is much higher than the sum of the drag torques in the transmission. Thus input shaft 1 is synchronized with the engine speed before it is forced to assume the synchronization speed for gear 3 110 due to the activation of the synchronization device in the transmission.

In Case II 60, the sum of the drag torques in the transmission is higher than the bearing friction relative to clutch K1. Consequently, the speed will decrease until in this case the synchronization speed in gear 3 110 is likewise enforced. A similar relationship exists for shifts from a higher gear to a lower gear. The output of the clutch K1—the clutch disk—that faces away from the engine in terms of torque transmission is firmly connected to input shaft 1. The same applies to clutch K2 and input shaft 2.

Due to spread for standard factory models, wear and the various driving maneuvers such as circling, in which the angular momentum changes, it is to be expected that the sum of the drag torques at the respective clutch in question may change relatively fast. The total of the drag torques for the duration of the gear shift, i.e., for the period in which the gear on the inactive input shaft 1 is in neutral 100, is at first considered to be constant.

As shown in FIG. 3, starting at point A, the speed declines at an approximately constant gradient. Thus for an evaluation of the speed change, measurements taken in period A-B1 for case I 50 and in period A-B2 for Case II 60 can be used to determine a drag torque. For this purpose, the equation $$M_S = \Theta_{EW1} \frac{\pi}{30} \dot{n}_1$$

is used with $M_S$ the drag torque, $\Theta_{EW1}$ the moment of mass inertia of input shaft 1, and $n_1$ the speed of input shaft 1. #

Figure 4:
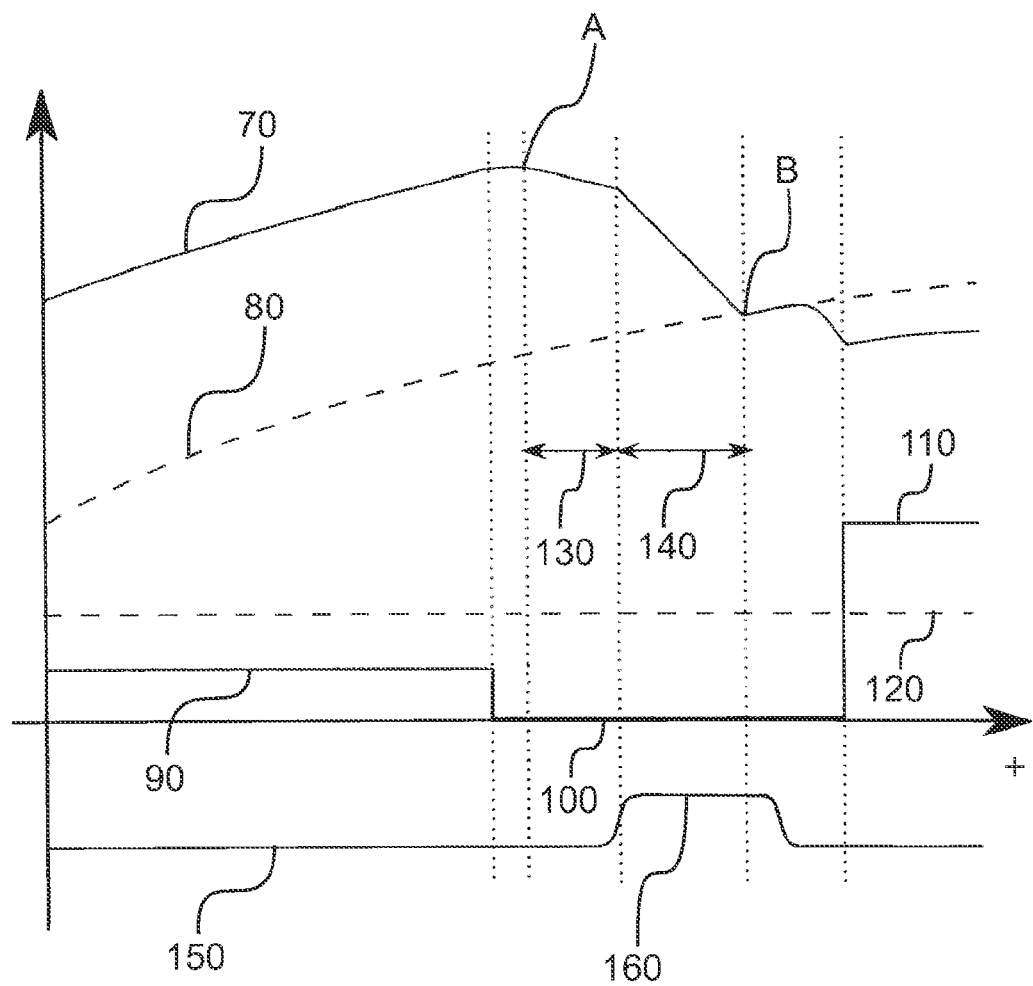
FIG. 4 illustrates a gear shift in two stages from gear 1 to gear 3 on the inactive input shaft; and, FIG. 5 illustrates a gear shift in two stages from gear 3 to gear 1 on the inactive input shaft.

FIG. 4 illustrates the method of the invention for shifting from gear 1 90 to gear 3 110.

Figure 5:
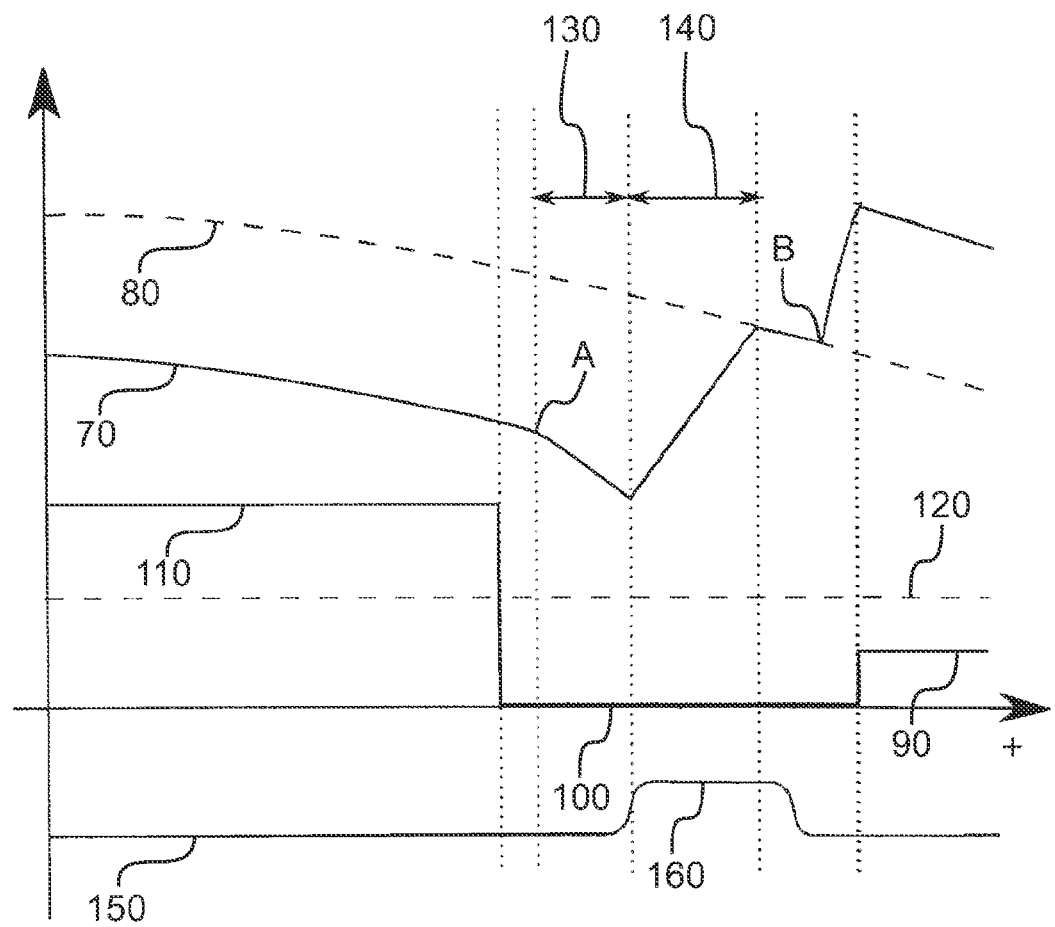

FIG. 5 illustrates the reverse shifting operation. In both figures, the vehicle is driving in second gear 120 on the active input shaft. Period P1 130 is used to determine the drag torque $M_S$. Then, during period P2 140, the clutch is moved into a predetermined position in which a low clutch torque $M_K$ is transmitted. Subsequently the sum of drag torque $M_S$ and clutch torque $M_K$ is calculated: $M=M_K+M_S$. In addition, M is calculated in accordance with $$M = \Theta_{EW1} \frac{\pi}{30} \dot{n}_1,$$

in this case including the effective clutch torque $M_K$. The torque at the clutch then results from $M_K=M-M_S$.

Depending on the speed ratios on the inactive input shaft with respect to the engine speed, the clutch torque is either positive or negative. Forming the absolute value, it is possible to indicate the clutch torque for the applied predetermined clutch position. If the result of the evaluation of the torque is exactly the desired contact point torque, the clutch position precisely corresponds to the contact point in a clutch without hysteresis. Usually, the determined clutch torque will be below or above the contact point torque. Thus using the clutch characteristic stored in the control device, it is easily possible to draw a conclusion as to the contact point. The method can be used on the inactive shaft for both clutches of a twin clutch transmission.

A considerable advantage over the method of the prior art is that the synchronization devices are not put under any more strain by the method of the invention than they would be in a vehicle without the method. In fact it is not necessary to make more frequent gear shifts. Depending on the transmission control, the periods in neutral may need to be slightly extended compared to a vehicle that does not use the method of the invention in order to be able to make use of the full interval up to point B lock-up in FIGS. 4 and 5.

Periods P1 and P2 are preferably selected to be between 0.1 and 1.0 seconds, especially between 0.2 and 0.5 seconds. The transition from P1 to P2 is dependent on the length of the path of the clutch actuator. This takes an estimated 0.2 to 0.4 seconds. The whole process from the beginning of period P1 to the end of period P2 takes less than 2.5 seconds, preferably less than 1.5 seconds.

In the description given above, gear shifts 1→3 and 3→1 on the partial transmission of the inactive input shaft have been explained by way of example. In this context, 1→3 means a gear shift from gear 1 to gear 3.

In accordance with the method of the invention, any gear shift between any gears that are on the same partial transmission as the respective inactive shaft is possible. This may vary in accordance with the construction of the transmission.

If, for instance, gears 1, 3, 5, 7 are arranged on the partial transmission of the inactive shaft, the following gear shifts are possible: 1→3, 3→1, 3→5, 5→3, 5→7, 7→5, but also multi-stage shifts such as 7→3, 7→1 etc.

If gears R, 2, 4, 6 are arranged on the partial transmission of the inactive shaft, the following gear shifts are possible: R→2, 2→R, 2→4, 4→2, 4→6, 6→4, but also multi-stage shifts such as 6→2 etc.

It may be expedient to disengage the preselected gear and then to reengage the same preselected gear; for instance during long highway drives in seventh gear with a preselected sixth gear on the inactive shaft, the sixth gear can be disengaged and reengaged after the contact point has been determined.

Hysteresis compensation occurs due to the fact that the torque is requested and the position is determined from the torque using the clutch model.

The calculation of the contact point from the clutch characteristic for a detected torque may be immediately used as a new contact point with the clutch open. It is likewise possible to calculate the difference between the old contact point and the newly determined contact point and to lead back to the old contact point in a correcting manner via a weighting operation. This is done to ensure that inaccuracies in the process of contact point determination only have a slight influence on the current contact point.

Contact points that are determined using the method of the invention may be combined with the contact points that are determined in accordance with the method described in document DE 10213946 A1 or with any other prior art method. The method of the invention and the method in accordance with DE 10213946 A1 may thus run in parallel since the method of DE 10213946 A1 can only operate when the clutch is closed or slipping, whereas the method of the invention operates when the clutch is open or a very low clutch torque is present. It is also conceivable to determine the contact point using the method of the invention disclosed herein and to determine the value of friction using the method disclosed in DE 10213946 A1.

To enable clutch point determination on the inactive shaft during longer constant drives, for example, it is possible to temporarily engage the neutral gear on the inactive shaft.

The determination of the contact points in accordance with the invention is carried out in the neutral phase during a gear preselection. In the process, the neutral phase may be extended as required. In the neutral phase, the clutch is usually open and the drag torques on the input shaft cause a speed change. The invention divides this neutral phase into two phases. In the first phase, the drag torque is determined; in the second phase the clutch is moved to a defined predetermined position. Thus the total of drag torque and clutch torque can be determined. Consequently, the clutch torque can be determined and may in general be used via the stored clutch characteristic to draw a conclusion in terms of the contact point using the known clutch position. The software contact point may then be directly predetermined or may be adapted to the determined contact point by a delta increment.

LIST OF REFERENCE NUMERALS 6 drive shaft
8 input shaft
10 input shaft
12 output shaft
14 actuator
16 actuator
18 actuator
20 actuator
22 partial transmission
24 partial transmission
26 control device
28 inputs
30 sensor
32 sensor
34 sensor
K1 clutch
K2 clutch
50 speed development Case I
60 speed development Case II
70 speed input shaft 1 (inactive)
80 speed input shaft 2 (active)
90 gear 1
100 neutral gear
110 gear 3
120 gear 2
130 period of time P1
140 period of time P2
150 progression of clutch K1
160 closing clutch K1 to predetermined position

What is claimed is:

1. A method for controlling a twin clutch transmission including at least two partial drive trains, each of which is coupleable to a combustion engine using a respective clutch (K1, K2), comprising the following steps to be carried out on the inactive partial drive train:
    shifting from an engaged gear to neutral with the clutch of the inactive partial drive train open;
    determining the drag torque $M_S$ of the input shaft of the inactive partial drive train during a predetermined period P1 (130);
    closing the clutch of the inactive partial drive train up to a predetermined position in which a clutch torque is transmitted and determining a total torque M of the input shaft of the inactive partial drive train during a predetermined period P2 (140);
    determining the clutch torque $M_K$ of the input shaft of the inactive partial drive train from the drag torque $M_S$ and the total torque M as the sum of the drag torque $M_S$ and the clutch torque $M_K$; and
    determining a contact point position from the absolute value of the determined clutch torque $M_K$ and a clutch characteristic of the clutch of the inactive partial drive train.

2. The method recited in claim 1, wherein the predetermined position is a position of the clutch of the inactive partial drive train that is between the open position of the clutch of the inactive partial drive train and the contact point position determined before period P1.

3. The method recited in claim 1, wherein the predetermined position is a position of the clutch of the inactive partial drive train that is between the open position of the clutch of the inactive partial drive train and the contact point position determined before period P1 plus an offset.

4. The method recited in claim 3, wherein the offset is between 0 and 5 millimeters.

5. The method recited in claim 1, wherein the drag torque $M_S$ is determined in accordance with the equation $$M_S = \Theta_{EW1} \frac{\pi}{30} \dot{n}_1,$$

with $\Theta_{EW1}$ the moment of mass inertia of the inactive input shaft of the inactive partial drive train and $n_1$ the speed of the inactive input shaft of the inactive partial drive train.

6. The method recited in claim 1, wherein the total torque M is determined in accordance with the equation $$M = \Theta_{EW1} \frac{\pi}{30} \dot{n}_1,$$

with $\Theta_{EW1}$ the moment of mass inertia of the inactive input shaft of the inactive partial drive train and $n_1$ the speed of the inactive input shaft of the inactive partial drive train.

7. A device for controlling a twin clutch transmission including at least two partial drive trains, each of which is coupleable to a combustion engine by means of a clutch (K1, K2), wherein a method as recited in claim 1 is carried out on the inactive partial drive train.

8. A method for controlling a twin clutch transmission including at least two partial drive trains, each of which is coupleable to a combustion engine using a respective clutch (K1, K2), comprising the following steps to be carried out on the inactive partial drive train:
    shifting from an engaged gear to a neutral gear (100) with the clutch of the inactive partial drive train open;
    determining the drag torque $M_S$ of the input shaft of the inactive partial drive train during a predetermined period P1 (130);
    closing the clutch of the inactive partial drive train up to a predetermined position in which a clutch torque is transmitted and determining a total torque M of the input shaft of the inactive partial drive train during a predetermined period P2 (140);
    determining the clutch torque $M_K$ of the input shaft of the inactive partial drive train from the drag torque $M_S$ and the total torque M as the sum of the drag torque $M_S$ and the clutch torque $M_K$; and
    determining a contact point position from the absolute value of the determined clutch torque $M_K$ and a clutch characteristic of the clutch of the inactive partial drive train, wherein the periods P1 and P2 are selected in a way that their sum is shorter than the period in which the neutral gear is engaged.

9. A method for controlling a twin clutch transmission including at least two partial drive trains, each of which is coupleable to a combustion engine using a respective clutch (K1, K2), comprising the following steps to be carried out on the inactive partial drive train:
    shifting from an engaged gear to neutral with the clutch of the inactive partial drive train open;
    determining the drag torque $M_S$ of the input shaft of the inactive partial drive train during a predetermined period P1 (130);
    closing the clutch of the inactive partial drive train up to a predetermined position in which a clutch torque is transmitted and determining a total torque M of the input shaft of the inactive partial drive train during a predetermined period P2 (140);

determining the clutch torque $M_K$ of the input shaft of the inactive partial drive train from the drag torque $M_S$ and the total torque M as the sum of the drag torque $M_S$ and the clutch torque $M_K$; and determining a contact point position from the absolute value of the determined clutch torque $M_K$ and a clutch characteristic of the clutch of the inactive partial drive train, wherein the clutch of the inactive partial drive train is subsequently opened and a gear is engaged in the inactive partial drive train, the gear being the same as or different from the gear from which a shift to neutral occurred with the clutch open.

* * * * *